United States Patent
Nakagawa et al.

(10) Patent No.: US 8,869,759 B2
(45) Date of Patent: Oct. 28, 2014

(54) CONTROL APPARATUS FOR VARIABLE VALVE ACTUATION SYSTEM AND CONTROL METHOD FOR VARIABLE VALVE ACTUATION SYSTEM

(75) Inventors: Takashi Nakagawa, Toyota (JP); Shunsuke Yamamoto, Toyota (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 0 days.

(21) Appl. No.: 13/988,628

(22) PCT Filed: Nov. 22, 2011

(86) PCT No.: PCT/IB2011/002766
§ 371 (c)(1),
(2), (4) Date: May 21, 2013

(87) PCT Pub. No.: WO2012/073083
PCT Pub. Date: Jun. 7, 2012

(65) Prior Publication Data
US 2013/0239918 A1 Sep. 19, 2013

(30) Foreign Application Priority Data
Nov. 30, 2010 (JP) ................. 2010-266930

(51) Int. Cl.
F01L 1/34 (2006.01)
F02D 41/24 (2006.01)
F02D 41/00 (2006.01)
F02D 41/22 (2006.01)
F01L 1/18 (2006.01)

(52) U.S. Cl.
CPC ............. *F01L 1/34* (2013.01); *F02D 41/2438* (2013.01); *F01L 2001/186* (2013.01); *F02D 41/0002* (2013.01); *F02D 2041/001* (2013.01); *F01L 2820/032* (2013.01); *F02D 41/221* (2013.01); *F02D 41/2464* (2013.01); *F01L 2800/11* (2013.01); *Y02T 10/42* (2013.01); *F01L 2800/00* (2013.01)
USPC ...................... 123/90.15; 123/90.17; 464/160

(58) Field of Classification Search
USPC .............................. 123/90.15, 90.17; 464/160
See application file for complete search history.

(56) References Cited

U.S. PATENT DOCUMENTS 7,594,487 B2 * 9/2009 Okamoto ................... 123/90.16

FOREIGN PATENT DOCUMENTS

| JP | A-2008-157088 | 7/2008 |
| JP | A-2008-286172 | 11/2008 |
| JP | 2009-127588 | 6/2009 |
| JP | A-2009-299543 | 12/2009 |

* cited by examiner

*Primary Examiner* — Ching Chang
(74) *Attorney, Agent, or Firm* — Oliff PLC

(57) ABSTRACT

In a variable valve actuation system capable of changing the angle of action of intake valves by using an actuator whose movement range is between a high end and a low end at which the movement of the actuator is mechanically stopped, it is determined that a fixation is present on condition that the actual amount of movement of the actuator in response to a command A for movement toward the low end that is issued when the present movement position of the actuator is unknown is not more than a prescribed movement criterion value a and that the actual amount of movement in response to a command B output subsequently to the command A in order to cause the actuator to operate in a direction opposite to the direction of the movement in response to the command B is not more than a prescribed movement criterion value b.

11 Claims, 7 Drawing Sheets

CONTROL APPARATUS FOR VARIABLE VALVE ACTUATION SYSTEM AND CONTROL METHOD FOR VARIABLE VALVE ACTUATION SYSTEM

BACKGROUND OF THE INVENTION

1. Field of the Invention

The invention relates to an apparatus for and a method of controlling a variable valve actuation system capable of changing a valve characteristic of engine valves by using an actuator whose movement range is between a first end and a second end at each of which the movement thereof is mechanically stopped.

2. Description of Related Art

As a system installed for an internal combustion engine that is mounted in a vehicle or the like, there have been commercialized variable valve actuation systems that change a valve characteristic of engine valves (intake and exhaust valves). As such a variable valve actuation system, there is known a system capable of changing the angle of action of the engine valves.

FIG. 8 shows an example of a variable valve actuation system capable of changing the angle of action of valves. This variable valve actuation system includes an actuator 103 that is made up of an electric motor 100 and a rotation/linear motion conversion mechanism 104 that converts rotation of the electric motor 100 into linear motion of a control shaft 101. On the control shaft 101, there is disposed a variable angle-of-action mechanism 102 that expands or reduces the angle of action of engine valves according to linear motion of the shaft 101.

Incidentally, the range of the linear motion of the control shaft 101 is mechanically restricted by stoppers 105 and 106. Using the stoppers 105 and 106, the movement range of the actuator 103 is restricted to a range between a high end and a low end at which the movement of the control shaft 101 is restricted mechanically by the stoppers 105 and 106, respectively.

The actuator 103 is controlled by an electronic control unit 108. The electronic control unit 108 receives a detection signal from a movement amount sensor 107 that detects the amount of movement of the actuator 103.

At the time of start of the valve angle-of-action control, the electronic control unit 108 drives the actuator 103 until the high end or the low end is reached, and then learns the position at which the movement is stopped, as a reference movement position. Then, the electronic control unit 108 determines an actual movement position of the actuator 103, that is, determines the actual angle of action of the engine valves, based on the amount of movement of the actuation 103 from the reference movement position. Because of this mechanism, it is possible to control the actual angle of action of the engine valves to a targeted angle of action without a need to directly detect the actual angle of action of the engine valves or the actual movement position of the actuator 103.

In some cases, however, the movement of the actuator 103 becomes fixed because of entrance of a foreign object into an engaging portion or the like. As a technology for determining whether or not the actuator 103 is having such a movement fixation, there are known technologies described in Japanese Patent Application Publication No. 2008-157088 (JP-A-2008-157088), Japanese Patent Application Publication No. 2008-286172 (JP-A-2008-286172), and Japanese Patent Application Publication No. 2009-299543 (JP-A-2009-299543).

In JP-A-2008-157088, the amount of movement of the actuator 103 when the actuator 103 is driven from the low end to the high end is measured, and if the measured value of the amount of movement is greatly deviated from a designed value thereof, it is determined that the aforementioned fixation is present.

Besides, in JP-A-2008-286172, the actuator 103 is driven to the high end and to the low end, and the positions thereof are learned. Then, if the distance between the high end and the low end that is determined from results of the learning is less than a designed value, it is determined that there has been a false learning about the high end or the low end due to fixation or the like.

Furthermore, in JP-A-2009-299543, it is determined that there is a possibility of presence of fixation when it is found for the first time that the actual movement position of the actuator 103 has not changed in response to a movement command that is output from the electronic control unit 108 to the actuator 103. Then, if it is found again that there is no change in the actual movement position of the actuator 103 in response to the movement command after the actuator 103 has been driven to the low end and the reference movement position has been re-learned, the determination that the fixation is present is established.

If the movement position of the actuator 103 is known, it is possible to immediately determine that fixation is present based on a finding that at an movement position other than the high end and the low end, the actuator 103 does not operate in response to the movement command from the electronic control unit 108. However, in the case where the movement position of the actuator 103 is not known, such as the case where the reference movement position has not been learned yet or the case where the power supply to the actuator 103 has been cut off, if the actuator 103 fails to operate, it cannot be determined whether the failure to operate is a result of fixation or a result of the arrival at the high end or the low end.

The above-described related-art fixation determination methods may be able to check whether or not fixation has occurred, but needs many procedure steps in order to complete the checking. Therefore, the related-art methods are not able to promptly check the presence or absence of fixation in a situation as mentioned above. For example, in JP-A-2008-157088 and JP-A-2008-286172, in order to perform the checking about fixation, it is necessary to drive the actuator 103 both to the high end and to the low end. In JP-A-2009-299543, in order to establish the determination that fixation is present, it is necessary to perform the re-learning of the reference movement position by driving the actuator 103 to the low end. Thus, all the related-art technologies require considerable amounts of time in order to determine the presence or absence of fixation. Besides, particularly in JP-A-2008-157088 and JP-A-2008-286172, the false learning of the reference movement position due to fixation is inevitable, and the variable control of the angle of action of valves is performed with a false recognition of the movement position until the presence of fixation is determined.

Incidentally, these problems can occur in any control apparatus for a variable valve actuation system in substantially the same manner as described above, as long as the control apparatus controls the variable valve actuation system by performing the learning of the reference movement position at the first end or the second end at each of which the movement of the actuator is mechanically stopped and then checking the movement position of the actuator based on the amount of movement thereof from the reference movement position.

SUMMARY OF THE INVENTION

The invention provides a control apparatus and a control method for a variable valve actuation system that are capable of promptly determining whether or not a movement fixation of an actuator is present in a situation where the movement position of the actuator is unknown.

A first aspect of the invention is an apparatus that controls a variable valve actuation system capable of changing a valve characteristic of an engine valve by using an actuator whose movement range is a range between a first end and a second end at both of which movement of the actuator is mechanically stopped. The variable valve actuation system control apparatus of the first aspect of the invention includes a control section that determines that a fixation is present on a condition that an actual amount of movement of the actuator in response to a movement command A for movement toward one of the first end and the second end that is issued when a present movement position of the actuator is unknown is less than or equal to a prescribed movement criterion value a, and that the actual amount of movement of the actuator in response to a movement command B that is output subsequently to the movement command A in order to cause movement of the actuator in a direction opposite to the direction of the movement caused in response to the movement command A is less than or equal to a prescribed movement criterion value b.

In the foregoing configuration, when the present movement position of the actuator is unknown, the movement command A for movement toward one of the first end and the second end is firstly output. If the actuator does not operate in response to the movement command A, there is possibility of the fixation. However, a similar situation occurs in the case where the movement position of the actuator is near the first end or the second end and then the actuator reaches the first end or the second end in response to the movement command A. Therefore, at this time point, it cannot be definitely determined whether the fixation is actually present.

After that, in the foregoing configuration, the movement command B for movement in the direction opposite to the direction of movement caused by the movement command A is output. If the fixation is actually present, the actuator does not operate in response to the movement command B either. On the other hand, if the actuator does not operate in response to the preceding movement command A because the low end is reached, the actuator ought to operate in response to the movement command B. Therefore, if the actuator does not operate in response to the movement command B either, it can be definitely determined that the fixation is actually present.

Thus, in the foregoing configuration, it can be determined that the fixation is present, merely by outputting the two movement commands that are different from each other in the direction of movement. Therefore, according to the foregoing configuration, it becomes possible to promptly perform the determination regarding the fixation in a situation where the movement position of the actuator is unknown.

In the variable valve actuation system control apparatus of the first aspect, the control section may determine that the fixation is not present when the actual amount of movement of the actuator in response to the movement command A that is greater than or equal to the movement criterion value a is found or when the actual amount of movement of the actuator in response to the movement command B that is greater than or equal to the movement criterion value b is found.

If it is certainly found that fixation is not present, it is desired that the variable control of the valve characteristic be promptly started. However, to that end, it is necessary to determine the actual movement position of the actuator by driving the actuator until the first end or the second end is reached and the movement of the actuator is stopped and by performing the learning of a reference movement position of the actuator at the position at which the movement is stopped.

Therefore, in the variable valve actuation system control apparatus of the first aspect, a configuration may be employed, in which, after it is determined that the fixation is not present, movement speed of the actuator is made faster than before, and the actuator is driven until the movement is stopped, and at a position where the movement is stopped, learning of a reference movement position of the actuator is performed. If the movement speed of the actuator after the determination of absence of the fixation is made faster than before, the time until the learning of the reference movement position is completed can be reduced. Besides, as a result, the valve characteristic variable control can be started earlier, and therefore the emission of the internal combustion engine can be improved.

Incidentally, if the actuator keenly responds to the movement command A described above, collision with the first end or the second end may occur. Besides, when the actuator is fixed, the actuator also sometimes rapidly responds to the movement command A if the fixed state is discontinued due to the movement command A.

Thus, in the variable valve actuation system control apparatus of the first aspect, a configuration may be employed, in which, when the movement of the actuator in response to the movement command A that is greater than or equal to the movement criterion value a is found, the movement of the actuator in the direction of movement designated by the movement command A is restricted at the present movement position. According to this configuration, the actuator will not operate farther than the movement position at which the operation is checked, so that the collision and the rapid response as mentioned above can be avoided.

In the case where after it is determined that the fixation is not present, the actuator is driven to the first end or the second end and the learning of the reference movement position of the actuator is performed, the movement command B may be to command the movement of the actuator toward one of the first end and the second end, at which the learning of a reference movement position of the actuator is performed after it is determined that the fixation is not present. If the movement command B commands movement toward the end at which the learning is performed, the control up to the completion of the learning can be simplified. That is, if the movement command B is to command movement toward the end opposite to the end at which the learning is performed, there is a need to reverse the direction of movement of the actuator in order to perform the learning after it is determined that the fixation is not present. On the other hand, if the movement command B is to command movement toward the end at which the learning is performed, it is possible to perform the learning while maintaining the direction of movement after it is determined that the fixation is not present. Therefore, the need to switch the direction of movement of the actuator can be minimized.

Incidentally, the control apparatus of the invention is applicable to a variable valve actuation system capable of changing the angle of action of an engine valve.

A second aspect of the invention is a variable valve actuation system control method for a variable valve actuation system capable of changing a valve characteristic of an engine valve by using an actuator whose movement range is a range between a first end and a second end at both of which movement of the actuator is mechanically stopped. The control method includes: sending to the actuator a movement command A to drive the actuator toward one of the first end and the second end when a present movement position of the actuator is unknown; sending to the actuator a movement command B to drive the actuator toward the other one of the first end and the second end; and determining that a fixation is present when actual amount of movement of the actuator in response to the movement command A is less than or equal to a prescribed movement criterion value a and the actual amount of movement of the actuator in response to the movement command B is less than or equal to a prescribed movement criterion value b.

The variable valve actuation system control method of the second aspect may further include determining that the fixation is not present when the actual amount of movement of the actuator in response to the movement command A that is greater than or equal to the movement criterion value a is found or when the actual amount of movement of the actuator in response to the movement command B that is greater than or equal to the movement criterion value b is found.

The variable valve actuation system control method of the second aspect may further include: driving, after it is determined that the fixation is not present, the actuator at an movement speed that is made faster than the movement speed of the actuator before it is determined that the fixation is not present, until the movement of the actuator is stopped; and performing the learning of a reference movement position of the actuator at a position where the movement is stopped.

The variable valve actuation system control method of the second aspect may further include restricting the movement of the actuator toward the one of the first end and the second end at the present movement position when the movement of the actuator in response to the movement command A that is greater than or equal to the movement criterion value a is found.

In the variable valve actuation system control method of the second aspect, the movement command B may be to command the movement of the actuator toward one of the first end and the second end, at which the learning of a reference movement position of the actuator is performed after it is determined that the fixation is not present.

The variable valve actuation system control method of the second aspect also achieves substantially the same effects as the foregoing variable valve actuation system control apparatus of the first aspect.

BRIEF DESCRIPTION OF THE DRAWINGS

Features, advantages, and technical and industrial significance of exemplary embodiments of the invention will be described below with reference to the accompanying drawings, in which like numerals denote like elements, and wherein.

DETAILED DESCRIPTION OF EMBODIMENTS

Figure 1:
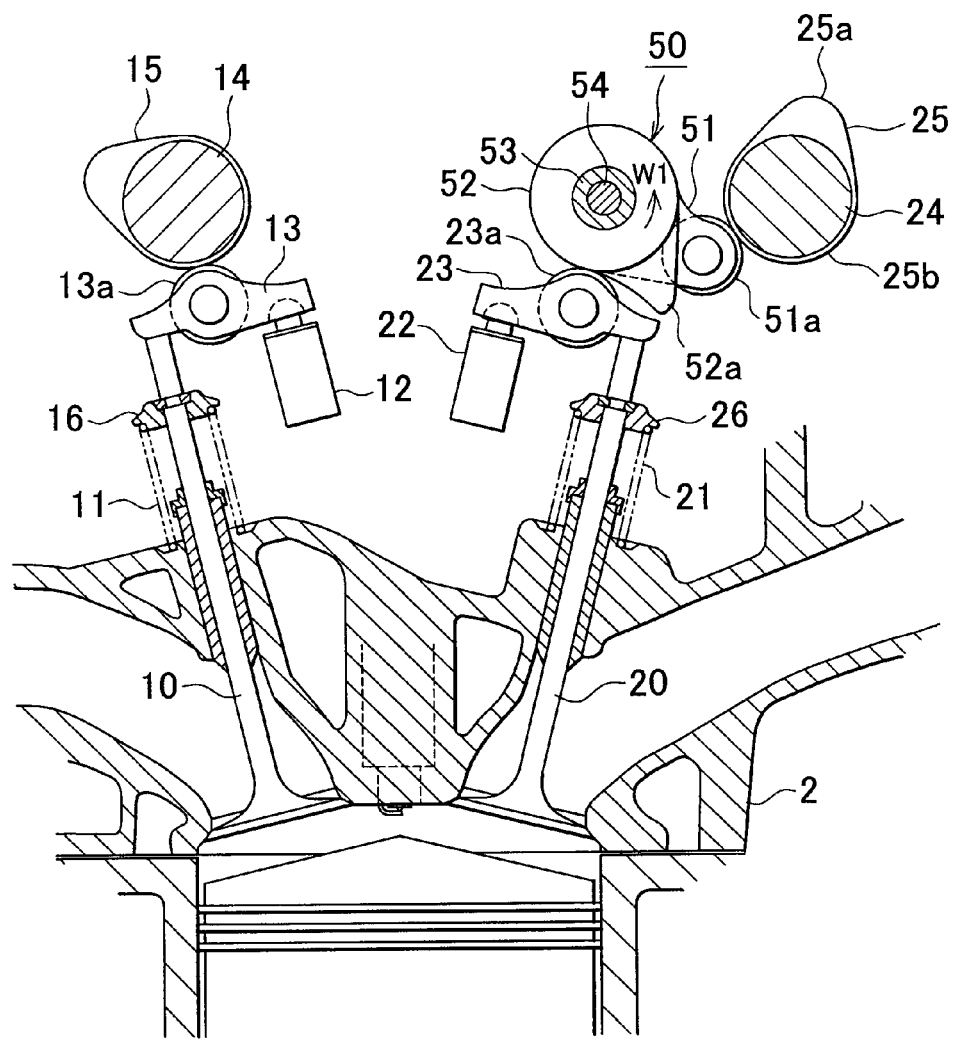
FIG. 1 is a sectional view showing a structure of a valve actuation system of an internal combustion engine to which an embodiment of the invention is applied.

An embodiment in which the control apparatus for a variable valve actuation system of the invention is embodied will be described in detail hereinafter with reference to FIGS. 1 to 7. As shown in FIG. 1, a cylinder head 2 of an internal combustion engine is provided with a pair of exhaust valves 10 and a pair of intake valves 20 for each cylinder.

An exhaust-valve actuation system that drives the exhaust valves 10 is provided with lash adjusters 12 that are provided separately for each exhaust valve 10. Between each lash adjuster 12 and a corresponding one of the exhaust valves 10, there is supported a rocker arm 13. An end of each rocker arm 13 is supported by a corresponding one of the lash adjusters 12, and the other end thereof is placed in contact with a base end portion of the corresponding exhaust valve 10. Besides, an exhaust camshaft 14 rotatably supported by the cylinder head 2 is provide with cams 15 that are as many as the exhaust valves 10. An outer peripheral surface of each cam 15 is in contact with a roller 13a that is provided rotatably at an intermediate portion of the rocker arm 13a. Besides, each exhaust valve 10 is provided with a valve spring 11 disposed in a compressed state between a retainer 16 fixed to the exhaust valve 10 and the cylinder head. Due to the urging force of the valve springs 11, the exhaust valves 10 are urged in a valve-closing direction, whereby the rollers 13a of the rocker arms 13 are pressed against the outer peripheral surfaces of the cams 15.

Meanwhile, as in the case of the exhaust-valve actuation system, an intake-valve actuation system that drives the intake valves 20 includes valve springs 21, retainers 26 fixed to the intake valves 20, rocker arms 23, and lash adjusters 22. Besides, an intake camshaft 24 rotatably supported by the cylinder head 2 is provided with cams 25 that are as many as the intake valves 20. Unlike the exhaust-valve actuation system, the intake-valve actuation system includes a variable angle-of-action mechanism 50 between the cams 25 and the rocker arms 23. The variable angle-of-action mechanism 50 has an input arm 51 and a pair of output arms 52 for each cylinder. The input arm 51 and the output arms 52 for each cylinder are pivotably supported by a support pipe 53 that is fixed to the cylinder head 2. It is to be noted herein that the rocker arms 23 are urged toward the output arms 52 by the lash adjusters 22 and the valve springs 21, and therefore the roller 23a rotatably provided in an intermediate portion of each rocker arm 23 is pressed against the outer peripheral surface of a corresponding one of the output arms 52. Due to this configuration, the input arm 51 is pivotally urged together with the output arms 52 in a counterclockwise direction W1 in FIG. 1, and a roller 51a rotatably provided at a distal end of the input arm 51 is pressed against the outer peripheral surface of a corresponding one of the cams 25.

Besides, a control shaft 54 is inserted within the support pipe 53 so as to be movable back and forth in the direction of an axis thereof. The control shaft 54 is drivingly linked to the input arms 51 and the output arms 52 via link members (not shown) that are provided within the variable angle-of-action mechanism 50 so that as the control shaft 54 is moved in the axis direction, the input arms 51 and the output arms 52 are relatively pivoted.

Figure 2:
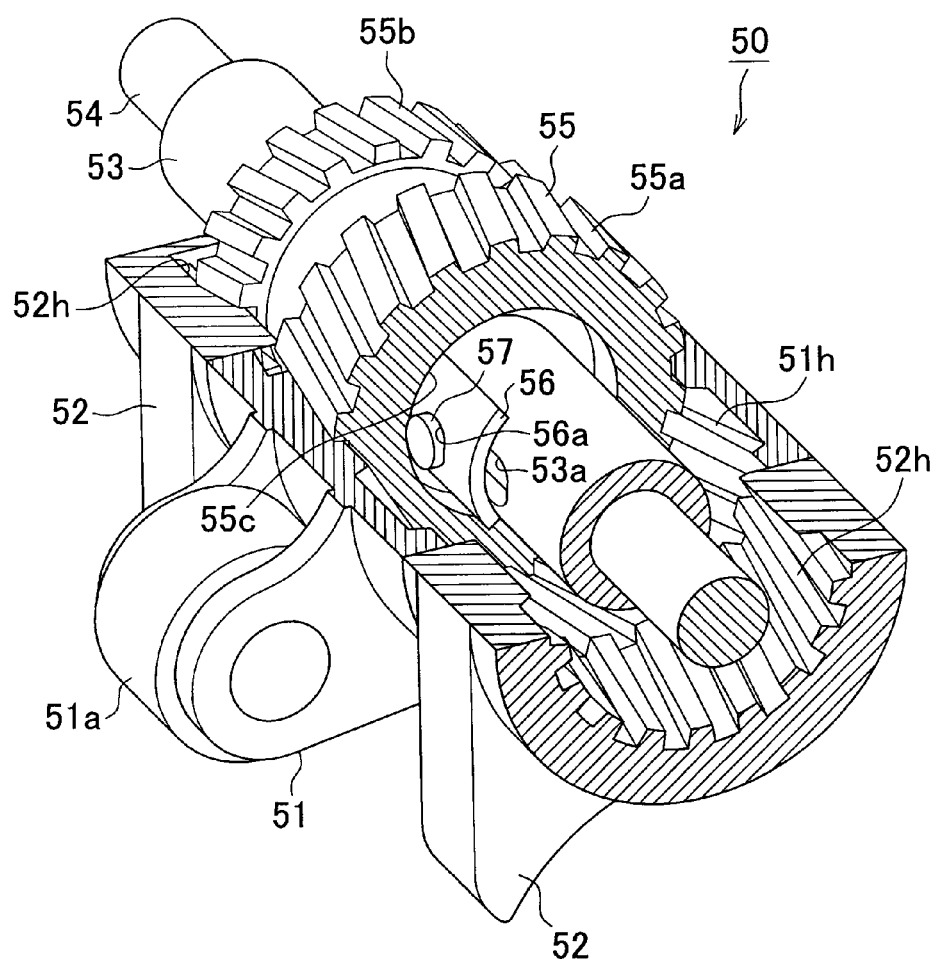
FIG. 2 is a perspective sectional view showing an internal structure of a variable angle-of-action mechanism used in the embodiment of the invention.

As can be seen in FIG. 2, which shows an internal structure of the variable angle-of-action mechanism 50, an input arm 51 is disposed between a pair of output arms 52 for each cylinder. An internal portion of each of the input arms 51 and the output arms 52 has a generally cylindrical insertion space. Besides, an inner peripheral surface of each input arm 51 has a helical spline 51*h*, and each output arm 52 has a helical spline 52*h*. Incidentally, the helical spline 51*h* formed on an inner peripheral surface of each input arm 51 and the helical spline 52*h* formed on an inner peripheral surface of each output arm 52 are inclined in opposite inclination directions in terms of the tooth lines.

A generally hollow-cylindrical slider gear 55 is disposed in the insertion space that is formed within the input arm 51 and the output arms 52 for each cylinder. On an outer peripheral surface of a central portion of the slider gear 55, there is formed a helical spline 55*a* that meshes with the helical spline 51*h* of the input arm 51. On outer peripheral surfaces of two opposite end portions of the slider gear 55, there are formed helical spline 55*b* that mesh with the helical splines 52*h* of the output arms 52.

On an inner wall of the slider gear 55, there is formed a groove 55*c* extending in a circumferential direction. A bush 56 is fitted in the groove 55*c*. The bush 56 is slidable along an inner peripheral surface of the groove 55*c* in the extending direction of the groove 55*c*, and the displacement of the bush 56 in the axis direction of the slider gear 55 is restricted.

The foregoing support pipe 53 is inserted in a through space that is formed within the slider gear 55. A pipe wall of the support pipe 53 is provided with an elongated hole 53*a* that extends in the axis direction. A engagement pin 57 is provided between the slider gear 55 and the control shaft 54 that is inserted within the support pipe 53. A proximal end of the engagement pin 57 is inserted in a depression portion (not shown) that is formed on the control shaft 54. A distal end of the engagement pin 57 is inserted in a through hole 56*a* that is formed in the bush 56. Due to this configuration, the control shaft 54 and the slider gear 55 are interlinked via the elongated hole 53*a*.

Figure 3:
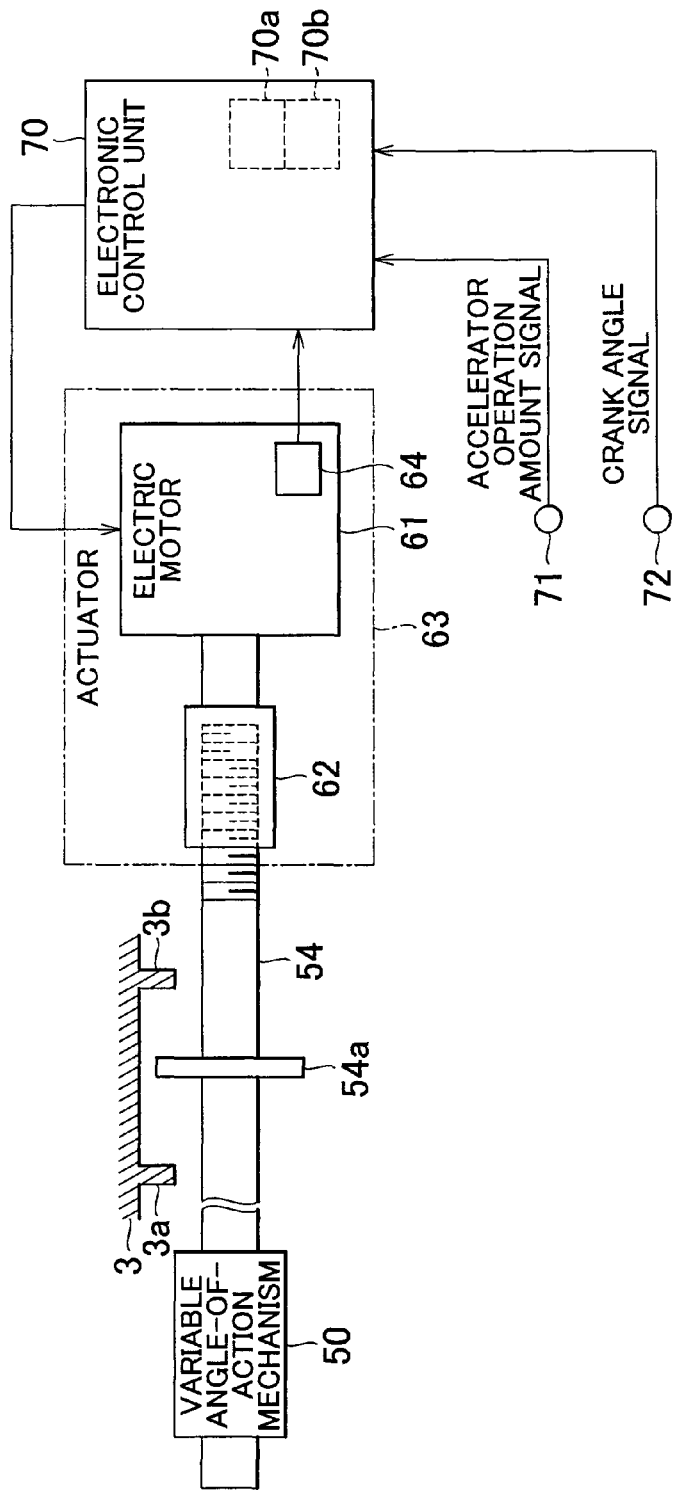
FIG. 3 is a schematic diagram schematically showing a variable valve actuation system, to which the embodiment is applied.

As shown in FIG. 3, a proximal end portion of the control shaft 54 is drivingly linked to an electric motor 61 via a rotation/linear motion conversion mechanism 62. The rotation/linear motion conversion mechanism 62 converts rotation motion of the electric motor 61 into liner motion of the control shaft 54 in the axis direction. That is, as the electric motor 61 is turned forward or reversely, the rotation is converted by the rotation/liner motion conversion mechanism 62 into reciprocating motion of the control shaft 54. The electric motor 61 and the rotation/linear motion conversion mechanism 62 constitute an actuator 63.

Besides, an outer periphery of the control shaft 54 is provided with a engagement portion 54*a* extending in radial directions. The engagement portion 54*a* is able to contact two stoppers 3*a* and 3*b* that are formed on a cylinder head cover 3 of the internal combustion engine. The control shaft 54 is movable between a movement position at which the movement of the control shaft 54 is mechanically stopped as the engagement portion 54*a* contacts the stopper 3*a* and the other movement position at which the movement of the control shaft 54 is mechanically stopped as the engagement portion 54*a* contacts the stopper 3*b*. Incidentally, in the description below, the movement position at which the engagement portion 54*a* contacts the stopper 3*a* will be referred to as the high end of the movement range of the actuator 63, and the movement position at which the engagement portion 54*a* contacts the stopper 3*b* will be referred to as the low end of the movement range of the actuator 63. In the embodiment, the high end and the low end correspond to the first end and the second end mentioned above in the summary of the invention.

The actuator 63 described above is controlled by an electronic control unit 70. The electronic control unit 70 feedback-controls the angle of action of the intake valves 20 according to the state of operation of the engine by controlling the driving of the electric motor 61. The electronic control unit 70 includes a non-volatile memory 70*a* that stores programs and data for use for controlling the electric motor 61, and a volatile memory 70*b* that temporarily stores results of computation and results of detection provided by sensors.

Besides, the electronic control unit 70 is connected to various sensors that detect the state of operation of the engine such as an accelerator operation amount sensor 71 that detects the amount of operation of an accelerator pedal, a crank angle sensor 72 that detects the rotation phase of a crankshaft of the internal combustion engine, etc.

Besides, a movement amount sensor 64 provided for the electric motor 61 is also connected to the electronic control unit 70. An output shaft of the electric motor 61 is provided with a multipole magnet that is rotatable together with the output shaft. As the output shaft of the electric motor 61 rotates, the movement amount sensor 64 outputs a pulse signal commensurate with the magnetism of the multipole magnet. Then, based on the number of pulses of the output signal of the movement amount sensor 64, the electronic control unit 70 checks the actual amount of rotation of the electric motor 61 and therefore the actual amount of movement of the actuator 63.

Next, operation of the variable valve actuation system constructed as described above will be described. In the exhaust-valve actuation system, as the exhaust camshaft 14 rotates together with the cams 15, the rocker arms 13 pivot about portions thereof supported by the lash adjusters 12 as supporting points. Due to the pivoting of the rocker arms 13, the exhaust valves 10 are driven in the opening and closing directions. On the other hand, in the intake-valve actuation system, as the intake camshaft 24 rotates together with the cams 25, the cams 25 press the input arms 51 while having a sliding contact with the rollers 51*a*, and therefore the output arms 52 are pivoted in the circumferential direction of the support pipe 53. Then, as the output arms 52 pivot, the rocker arms 23 pivot about portions thereof supported by the lash adjusters 22 as supporting points, so that the intake valves 20 are driven in the opening and closing directions (see FIG. 1 for the description given above).

Besides, if the control shaft 54 is driven by the actuator 63 so as to be displaced in the axis direction, the slider gears 55 is displaced in the axis direction in association with the axial displacement of the control shaft 54. It is to be noted herein that since the helical splines 55*a* and 55*b* formed on the outer peripheral surfaces of the slider gear 55 for each cylinder are in mesh with the helical splines 51*h* and 52*h* formed on the inner peripheral surfaces of the input arm 51 and the output arms 52, the input arm 51 and the output arms 52 pivot about the supporting pipe 53 as the slider gear 55 is displaced in the axis direction. Since the tooth lines of the helical spline 55*a* and the tooth lines of the helical splines 55*b* are inclined in the opposite directions, the output arms 52 are pivoted in the direction opposite to the pivoting direction of the input arm 51. As a result, the relative phase difference between the input arm 51 and the output arms 52 is changed, so that the angle of action of the intake valves changes (see FIGS. 1 and 2 for the foregoing description).

In the variable valve actuation system described above, the absolute values of the movement position of the actuator 63 and of the angle of action of the intake valves 20 are not detected, but only the relative amount of movement of the actuator 63 is detected. Therefore, in order to know the absolute values of the movement position of the actuator 63 and the angle of action of the intake valves 20, the electronic control unit 70 performs the learning of a reference movement position as described below. That is, when the absolute value of the movement position of the actuator 63 is not known, the electronic control unit 70 performs a high-end learning in which the high end position is checked by driving the actuator 63 to the high end side until the engagement portion 54*a* contacts the stopper 3*a*, that is, the high end is reached. After that, the electronic control unit 70 sets the learned movement position of the actuator 63 as a reference movement position, and measures the amount of movement from the reference movement position to check the actual amount of movement of the actuator 63. Incidentally, the electronic control unit 70 also performs a low-end learning in which the low end position is checked by driving the actuator 63 until the engagement portion 54*a* contacts the stopper 3*b* and therefore the actuator 63 reaches the low end, during the fuel cut of the internal combustion engine, or the like.

If the movement position of the actuator 60 becomes unknown due to the memory clear of the volatile memory 70*b* caused by power off or the like, the electronic control unit 70 performs the high-end learning by driving the actuator 63 to the high end side until the high end is reached. At this time, if the movement of the actuator 63 stops due to the fixation caused by entrance of a foreign object into an engaging portion or the like, the electronic control unit 70 falsely recognizes that the movement position occurring when the movement stops is the high end position, and thus performs a false learning. Therefore, in this embodiment, the stop of movement due to the arrival at the high end or the low end and the stop of movement due to fixation are clearly distinguished from each other in the following manner.

That is, when the present movement position of the actuator 63 is unknown, the electronic control unit 70 firstly outputs a movement command A for the movement toward the low end. If the actuator 63 does not operate in response to the movement command A, there is possibility of fixation. However, substantially the same situation occurs when the movement position of the actuator 63 is near the low end and the actuator 63 immediately reaches the low end in response to the movement command A. Therefore, at this time point, it cannot be definitely determined whether or not fixation is actually present.

After that, the electronic control unit 70 outputs to the actuator 63 an movement command B for the movement in the direction opposite to the direction of movement caused by the movement command A, that is, the movement toward the high end. At this time, if fixation is actually present, the actuator 63 does not operate in response to the movement command B either. If the actuator 63 does not operate in response to the preceding movement command A because of the arrival at the low end, the actuator 63 ought to operate in response to the movement command B. Therefore, if the actuator 63 does not operate in response to the movement command B either, it can be definitely determined that fixation is actually present.

Figure 4:
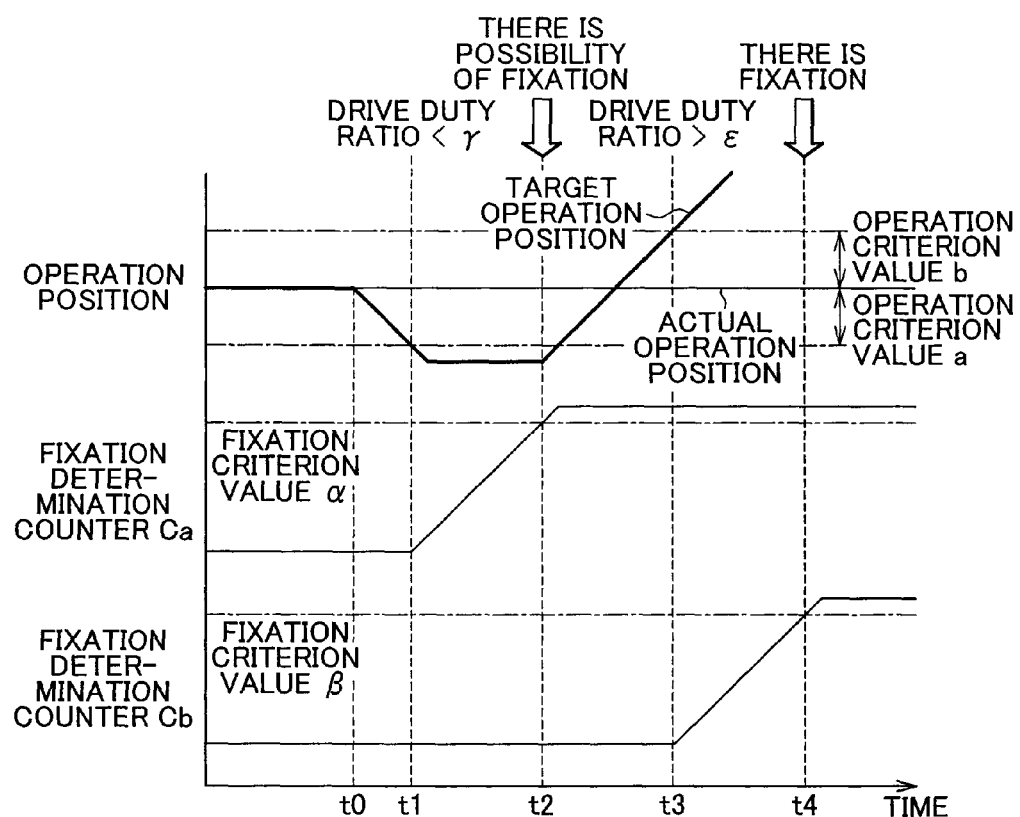
FIG. 4 is a time chart showing a manner of control at the time of fixation in the embodiment.

FIG. 4 shows transitions of the target angle of action, the actual angle of action, and a fixation determination counter in the event of fixation. At a time point t0, when the high-end learning control is started, the target movement position of the actuator 63 is changed to the low end side. Because of fixation, the actual movement position of the actuator 63 at this time does not follow the target movement position, but remains at the movement position that is assumed at the time of starting the learning. In this example shown, the time from a time point t1 at which the drive duty ratio of the actuator 63 becomes less than a threshold value $\gamma$ until movement of the actuator 63 is found is measured by a fixation determination counter Ca. Then, at a time point t2, when the value of the fixation determination counter Ca exceeds a prescribed fixation criterion value a, it is determined that there is possibility of fixation. Incidentally, in this embodiment, when the actual amount of movement of the actuator 63 in response to the movement command A exceeds a prescribed movement criterion value a, it is determined that the actuator 63 has operated.

If it is determined that there is possibility of fixation, the target movement position of the actuator 63 is changed to the high end side. At this time, too, because of the fixation, the actual movement position of the actuator 63 does not follow the target movement position, but remains at the movement position assumed at the time of start of the learning. In this example, the time from a time point t3 at which the drive duty ratio of the actuator 63 exceeds a threshold value $\epsilon$ until the movement of the actuator 63 is found is measured by a fixation determination counter Cb. Then, at a time point t4, when the value of the fixation determination counter Cb exceeds a prescribed fixation criterion value $\beta$, the determination that fixation is present is established. Incidentally, in this embodiment, when the actual amount of movement of the actuator 63 in response to the movement command B exceeds a prescribed movement criterion value b, it is determined that the actuator 63 has operated.

Figure 5:
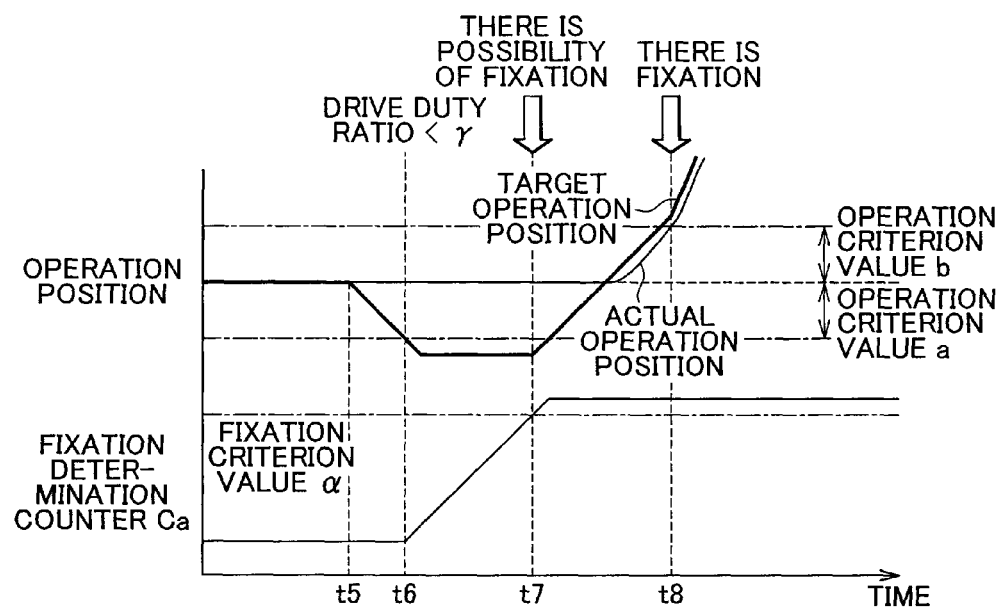
FIG. 5 is a time chart showing a manner of control at the time of arrival at a low end in the embodiment.

FIG. 5 shows transitions of the target angle of action, the actual angle of action, and the fixation determination counter when the movement of the actuator 63 stops due to the arrival at the low end. At a time point t5, when the high-end learning control is started, the target movement position of the actuator 63 is firstly changed to the low end side. Because of the arrival at the low end, the actual movement position of the actuator 63 at this time does not follow the target movement position, but remains at the movement position that is assumed at the time of starting the learning. Then, at a time point t7, when the prescribed fixation criterion value $\alpha$ is exceeded by the value of the fixation determination counter Ca starting measuring time at a time point to at which the drive duty ratio of the actuator 63 becomes less than the threshold value $\gamma$, it is determined that there is possibility of fixation.

After it is determined that there is possibility of fixation, the target movement position of the actuator 63 is changed to the high end side. The movement of the actuator 63 to the low end side is restricted by the arrival at the low end, but the movement thereof to the high end side is not restricted. Therefore, the actual movement position of the actuator 63 changes following the target movement position. Then, at a time point t8, when a change in the actuation amount of movement exceeding the movement criterion value b is found, it is determined that fixation is not present. Then, the driving of the actuator 63 to the high end side is continued until the movement is stopped, and at the position where the movement is stopped, the high-end learning is performed. Incidentally, in this embodiment, if a movement of the actuator 63 in response to the movement command B that exceeds the movement criterion value b is found, the movement speed of the actuator 63 is made faster than before.

Figure 6:
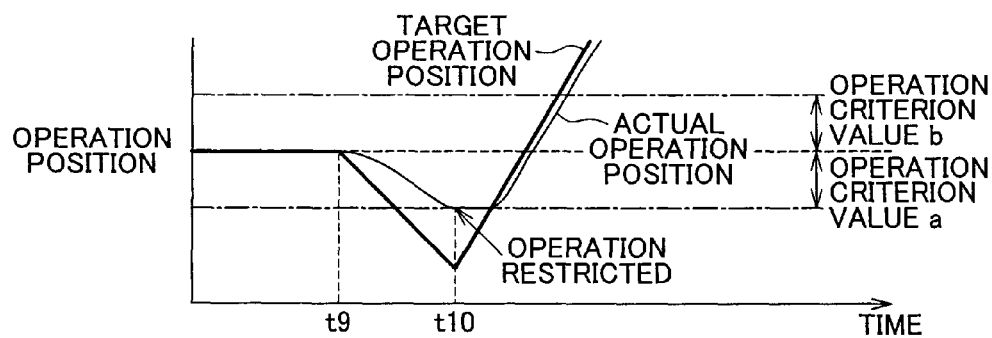
FIG. 6 is a time chart showing a manner of control in the embodiment that is performed when neither the fixation nor the arrival at the low end is present.

FIG. 6 shows transitions of the target angle of action, the actual angle of action, and the fixation determination counter when there is neither fixation nor arrival at the low end. At a time point t9, when the high-end learning control is started, the target movement position of the actuator 63 is firstly changed to the low end side. At this time, the actual movement position of the actuator 63 changes following the target movement position. Then, at a time point t10, when a movement of the actuator 63 that exceeds the movement criterion value a is found, it is determined that fixation is not present. Incidentally, in this embodiment, when the change of the target movement position to the low end side, that is, the movement of the actuator 63 in response to the movement command A for the movement toward the low end that exceeds the movement criterion value a, is found, the movement of the actuator 63 in the direction of the movement commanded by the movement command A, that is, toward the low end side, is restricted at the present movement position.

If it is determined that there is no fixation, the target movement position of the actuator 63 is changed to the high end side. After that, the driving of the actuator 63 to the high end side is continued until the movement is stopped, and then at the position at which the movement is stopped, the high-end learning is performed. At this time, too, the movement speed of the actuator 63 after it is determined that there is no fixation is made faster than before.

Figure 7:
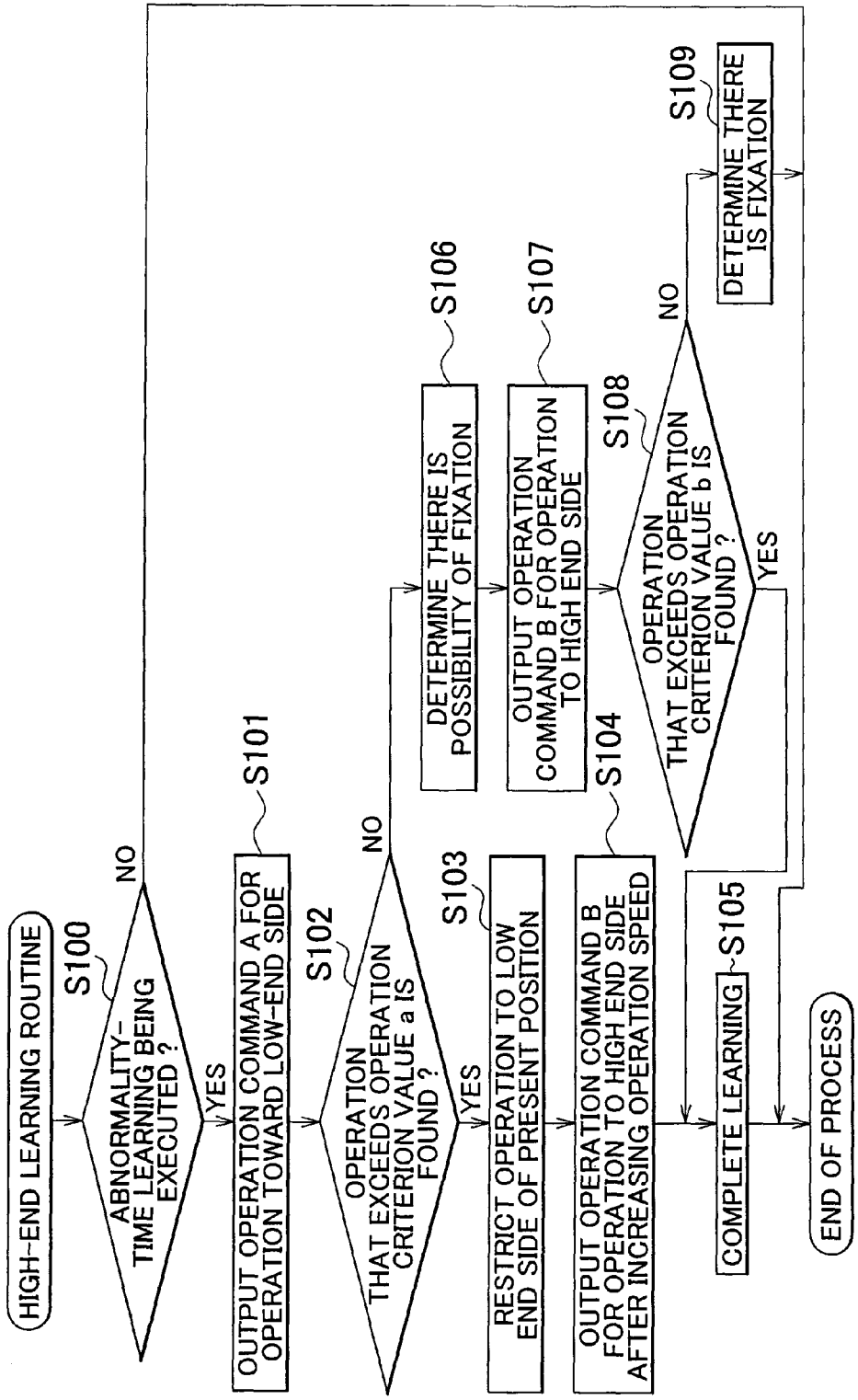
FIG. 7 is a flowchart of a high-end learning routine used in the embodiment.
Figure 8:
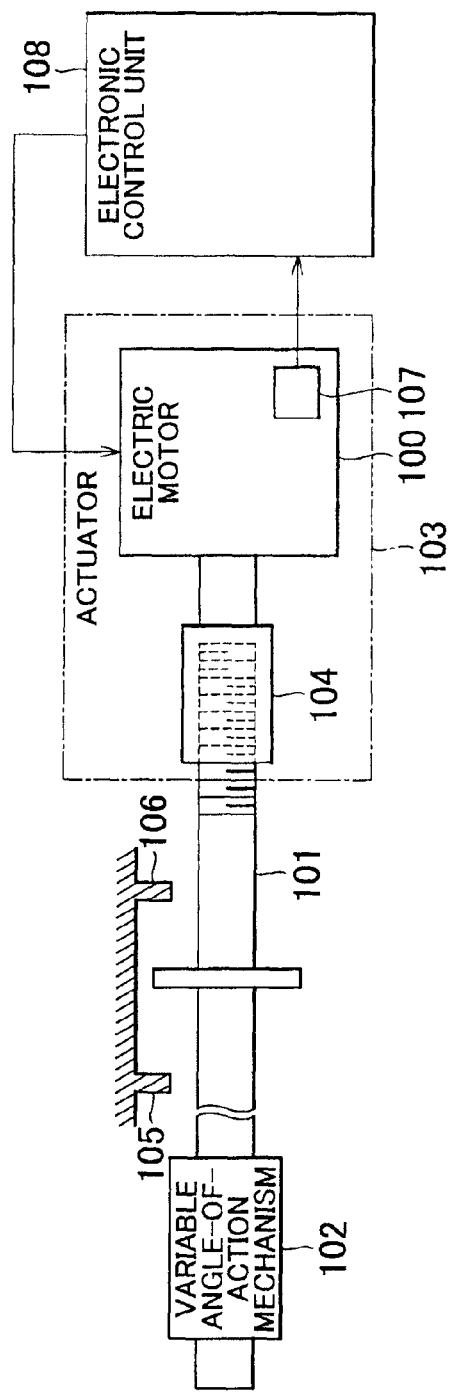
FIG. 8 is a schematic diagram schematically showing an overall configuration of a related-art variable valve actuation system.

FIG. 7 shows a flowchart of a high-end learning routine that is applied to the above-described embodiment. The process of this routine is executed by the electronic control unit 70. When the routine is started, it is determined firstly in step S100 whether or not an abnormal-time learning is being executed. That is, it is determined whether or not the present state is a state in which the movement position of the actuator 63 has become unknown and the high-end learning needs to be executed again. If the abnormal-time learning is not being executed (NO in S100), the present process of this routine is immediately ended.

If the abnormal-time learning is being executed (YES in S100), the movement command A for the movement toward the low end side is output to the actuator 63 in step S101. Then, subsequently in step S102, it is determined whether or not an movement of the actuator 63 that exceeds the movement criterion value a has been found.

If the movement of the actuator 63 in response to the movement command A is found (YES in S102), the movement of the actuator 63 toward the low end side is restricted at the present movement position in step S103. Then in step S104, the movement speed is accelerated, and then the movement command B for the movement toward the high end side is output to the actuator 63. If the actuator 63 is driven until the high end is reached, the high-end learning is ended in step S105, and then the process of this routine is ended.

On the other hand, if in step S102 the above-described movement of the actuator 63 is not found (NO in S102), it is determined in step S106 that there is possibility of fixation. Subsequently in step S107, the movement command B for the movement toward the high end side is output to the actuator 63.

If an movement of the actuator 63 in response to the movement command B that exceeds the movement criterion value b is found (YES in S108), the movement of the actuator 63 to the high end side is continued until the high end is reached, and the high-end learning is completed according to the arrival of the actuator 63 at the high end (S105).

On the other hand, if the movement of the actuator 63 in response to the movement command B is not found (NO in S108), it is determined in step S109 that fixation is present, and then the process of the routine is ended. Incidentally, at this time, as a fail-safe process, an engine control is carried out while the variable angle-of-action control is stopped.

According to the control apparatus for the variable valve actuation system of the embodiment, the following effects can be achieved. (1) In this embodiment, when the present movement position of the actuator 63 is unknown, the movement command A for the movement toward the low end is output, and then the movement command B for the movement toward the high end is output. Then, on condition that the actual amount of movement of the actuator 63 in response to the movement command A is less than or equal to the prescribed movement criterion value a and the actual amount of movement of the actuator 63 in response to the movement command B is less than or equal to the prescribe movement criterion value b, it is determined that fixation is present. In this embodiment, the presence of fixation can be definitely determined merely by outputting the two movement commands A and B that are different from each other in the movement direction. Therefore, according to the embodiment, the determination regarding fixation can be promptly performed in a situation where the movement position of the actuator 63 is unknown.

(2) In this embodiment, when the movement of the actuator 63 in response to the movement command A that is greater than or equal to the movement criterion value a is found, the movement of the actuator 63 in the direction of the low end is restricted at the present movement position. Therefore, the actuator 63 does not operate beyond the movement position at which the operation is checked, and the collision with the low end due to keen response of the actuator 63 and the rapid response of the actuator 63 in response to discontinuation of a fixed state can be avoided.

(3) In this embodiment, the movement speed of the actuator 63 after it is determined that there is no fixation is made faster than before. Therefore, the time required until the high-end learning is completed can be reduced. Besides, as a result, the start of the variable angle-of-action control can be made earlier, and the emission of the internal combustion engine can be improved.

(4) In this embodiment, after the movement command A for the movement toward the low end is output, the movement command B for the movement toward the high end is output. Incidentally, the high end herein is the end where the learning of the reference movement position of the actuator 63 is performed after it is determined that there is no fixation. Therefore, the control up to the completion of the high-end learning can be simplified. That is, if the movement command B is a command for a movement toward the low end, the movement direction of the actuator 63 needs to be reversed in order to perform the learning after it is determined that fixation is not present. In contrast, if the movement command B is a command for a movement toward the high end where the learning is to be performed, it is possible to perform the learning while maintaining the movement direction even after it is determined that there is no fixation, and the need to switch the movement direction of the actuator 63 can be minimized.

Incidentally, the foregoing embodiment may also be carried out with the following modifications or changes.
•Although in the foregoing embodiment, the movement of the actuator 63 is accelerated after it is determined that there is no fixation, the acceleration of the movement of the actuator 63 may be omitted in the case where there is no need to rush the completion of the high-end learning, the case where the acceleration of the actuator 63 is difficult because of the structure, etc.

Although in the foregoing embodiment, the high-end learning is performed after the determination that there is no fixation, it is also permissible to perform the low-end learning after the determination. In that case, when the output of the movement command for the movement toward the high end is followed by the output of the movement command for the movement toward the low end in order to determine the presence or absence of fixation, the need to switch the movement direction of the actuator 63 can be minimized.

In the foregoing embodiment, when a movement of the actuator 63 that is greater than or equal to the movement criterion value a is found in response to the movement command A for the movement toward the low end, a process is performed in which the movement of the actuator 63 in the direction of the low end is restricted at the present movement position. However, in the case where such restriction is not particularly needed, the process may be omitted.

Although in the foregoing embodiment, following the movement command A for the movement toward the low end, the movement command B for movement toward the high end is output in order to determine the presence or absence of fixation, it is also possible to output the movement command for the movement toward the low end and then determine the presence or absence of fixation after the movement command for the movement toward the high end is output.

Although the embodiment is described above in conjunction with the variable valve actuation system capable of changing the angle of action of the intake valves 20, the invention is also applicable in substantially the same manner to a variable valve actuation system capable of changing the angle of action of the exhaust valves 10.

The configuration of the variable angle-of-action mechanism 50 in the foregoing embodiment is not limited to that shown in FIGS. 1 and 2, but may also be changed as appropriate. The invention is applicable to any variable valve actuation system in substantially the same manner, as long as it is a variable valve actuation system that includes a variable angle-of-action mechanism capable of changing the angle of action of an engine valve by using an actuator whose movement range is a range between the high end and the low end at which the movement thereof is mechanically stopped.

The embodiment is described above in conjunction with the case where the invention is applied to the variable valve actuation system capable of changing the angle of valve action. However, the invention is also applicable in substantially the same manner to any variable valve actuation system capable of changing a valve characteristic other than the valve angle of action as long as the system includes an apparatus that controls the variable valve actuation system capable of changing a valve characteristic of an engine valve by using an actuator whose movement range is a range between a first end and a second end at which the action thereof is mechanically stopped, and that controls the variable valve actuation system by performing the learning of a reference movement position at the first end or the second end at which the movement of the actuator is mechanically stopped and then checking the movement position of the actuator based on the amount of movement from the reference movement position.

The invention has been described with reference to example embodiments for illustrative purposes only. It should be understood that the description is not intended to be exhaustive or to limit form of the invention and that the invention may be adapted for use in other systems and applications. The scope of the invention embraces various modifications and equivalent arrangements that may be conceived by one skilled in the art.

The invention claimed is:

1. A variable valve actuation system control apparatus that controls a variable valve actuation system configured to change a valve characteristic of an engine valve by using an actuator whose movement range is a range between a first end and a second end at both of which movement of the actuator is mechanically stopped, the control apparatus comprising:
    a control section that determines that a fixation is present on a condition that an actual amount of movement of the actuator in response to a movement command A for movement toward one of the first end and the second end that is issued when a present position of the actuator is unknown is less than or equal to a prescribed movement criterion value a, and that the actual amount of movement of the actuator in response to a movement command B that is output subsequently to the movement command A in order to cause movement of the actuator in a direction opposite to the direction of the movement caused in response to the movement command A is less than or equal to a prescribed movement criterion value b.

2. The variable valve actuation system control apparatus according to claim 1, wherein
    the control section determines that the fixation is not present when the actual amount of movement of the actuator in response to the movement command A that is greater than the movement criterion value a is found or when the actual amount of movement of the actuator in response to the movement command B that is greater than the movement criterion value b is found.

3. The variable valve actuation system control apparatus according to claim 2, wherein
    after it is determined that the fixation is not present, movement speed of the actuator is made faster than before, and the actuator is driven until the movement is stopped, and at a position where the movement is stopped, learning of a reference position of the actuator is performed.

4. The variable valve actuation system control apparatus according to claim 3, wherein
    the movement command B commands the movement of the actuator toward one of the first end and the second end, at which one end the learning of a reference position of the actuator is to be performed after it is determined that the fixation is not present.

5. The variable valve actuation system control apparatus according to claim 1, wherein
    when the control section determines that the actuator has been moved in response to the movement command A by an amount that is greater than or equal to the movement criterion value a, the movement of the actuator in the direction of movement commanded by the movement command A is restricted at the present position.

6. The variable valve actuation system control apparatus according to claim 1, wherein
    the variable valve actuation system changes the angle of action of the engine valve.

7. A variable valve actuation system control method for a variable valve actuation system configured to change a valve characteristic of an engine valve by using an actuator whose movement range is a range between a first end and a second end at both of which movement of the actuator is mechanically stopped, the control method comprising:
    sending to the actuator a movement command A to drive the actuator toward one of the first end and the second end when a present position of the actuator is unknown;
    sending to the actuator a movement command B to drive the actuator toward the other one of the first end and the second end; and
    determining that a fixation is present when actual amount of movement of the actuator in response to the movement command A is less than or equal to a prescribed movement criterion value a and the actual amount of movement of the actuator in response to the movement command B is less than or equal to a prescribed movement criterion value b.

8. The variable valve actuation system control method according to claim 7, further comprising:

determining that the fixation is not present when the actual amount of movement of the actuator in response to the movement command A that is greater than the movement criterion value a is found or when the actual amount of movement of the actuator in response to the movement command B that is greater than the movement criterion value b is found.

9. The variable valve actuation system control method according to claim 8, further comprising:

driving, after it is determined that the fixation is not present, the actuator at a movement speed that is made faster than the movement speed of the actuator before it is determined that the fixation is not present, until the movement of the actuator is stopped; and performing the learning of a reference position of the actuator at a position where the movement is stopped.

10. The variable valve actuation system control method according to claim 8, wherein the movement command B commands the movement of the actuator toward one of the first end and the second end, at which one end the learning of a reference position of the actuator is to be performed after it is determined that the fixation is not present.

11. The variable valve actuation system control method according to claim 7, further comprising:

restricting the movement of the actuator toward the one of the first end and the second end at the present position when it is determined that the actuator has been moved in response to the movement command A by an amount that is greater than or equal to the movement criterion value a.

* * * * *